United States Patent
Arbel (10) Patent No.: US 10,481,944 B2
(45) Date of Patent: Nov. 19, 2019

(54) ADAPTIVE QUALITY OF SERVICE CONTROL CIRCUIT

(71) Applicant: Xilinx, Inc., San Jose, CA (US)

(72) Inventor: Ygal Arbel, Morgan Hill, CA (US)

(73) Assignee: XILINX, INC., San Jose, CA (US)

( * ) Notice: Subject to any disclaimer, the term of this patent is extended or adjusted under 35 U.S.C. 154(b) by 148 days.

(21) Appl. No.: 15/673,220

(22) Filed: Aug. 9, 2017

(65) Prior Publication Data
US 2019/0050252 A1  Feb. 14, 2019

(51) Int. Cl.
| | | |
|---|---|---|
| *G06F 9/46* | (2006.01) | |
| *G06F 3/06* | (2006.01) | |
| *G06F 15/78* | (2006.01) | |
| *G06F 11/30* | (2006.01) | |
| *G06F 13/16* | (2006.01) | |
| *G06F 11/34* | (2006.01) | |

(52) U.S. Cl.
CPC ............. *G06F 9/467* (2013.01); *G06F 3/061* (2013.01); *G06F 3/064* (2013.01); *G06F 3/0628* (2013.01); *G06F 11/3027* (2013.01); *G06F 11/349* (2013.01); *G06F 13/1621* (2013.01); *G06F 13/1668* (2013.01); *G06F 15/7807* (2013.01)

(58) Field of Classification Search
CPC .. G06F 9/467; G06F 13/1668; G06F 15/7807; G06F 3/061; G06F 3/0628; G06F 3/0611; G06F 3/0613
See application file for complete search history.

(56) References Cited

U.S. PATENT DOCUMENTS

| | | |
|---|---|---|
| 6,941,538 B2 | 9/2005 | Hwang et al. |
| 7,007,264 B1 | 2/2006 | Baxter |
| 7,058,921 B1 | 6/2006 | Hwang et al. |
| 7,216,328 B2 | 5/2007 | Hwang et al. |
| 7,509,614 B2 | 3/2009 | Hwang et al. |
| 7,701,902 B1 | 4/2010 | Possley |
| 8,020,163 B2 | 9/2011 | Nollet et al. |
| 8,549,199 B2 * | 10/2013 | Mace ................... G06F 13/161 710/240 |
| 8,612,648 B1 | 12/2013 | Murray |

(Continued)

FOREIGN PATENT DOCUMENTS

WO   2016209268   12/2016

*Primary Examiner* — Tracy A Warren
(74) *Attorney, Agent, or Firm* — LeRoy D. Maunu (57) ABSTRACT

Disclosed approaches of controlling quality of service in servicing memory transactions includes periodically reading by a quality of service management (QM) circuit, respective first data rate metrics and respective latency metrics from requester circuits while the requester circuits are actively transmitting memory transactions to a memory controller. The QM circuit periodically reads a second data rate metric from the memory controller while the memory controller is processing the memory transactions, and determines, while the requester circuits are actively transmitting memory transactions to the memory controller, whether or not the respective first data rate metrics, respective latency metrics, and second data rate metric satisfy a quality of service metric. In response to determining that the operating metrics do not satisfy the quality of service metric, the QM circuit dynamically changes value(s) of a control parameter(s) of the requester circuit(s) and of the memory controller.

20 Claims, 4 Drawing Sheets

(56) References Cited

U.S. PATENT DOCUMENTS

| | | |
|---|---|---|
| 9,038,072 B2 | 5/2015 | Nollet et al. |
| 2004/0210782 A1 | 10/2004 | Hsu |
| 2008/0034148 A1 | 2/2008 | Gower et al. |
| 2012/0246368 A1* | 9/2012 | Kwon ................. G06F 13/3625 710/110 |
| 2015/0260787 A1* | 9/2015 | Chang ................. G06F 11/3433 324/750.3 |
| 2016/0196231 A1 | 7/2016 | Quach et al. |
| 2018/0189097 A1* | 7/2018 | Bruce .................... G06F 9/467 |
| 2019/0007319 A1* | 1/2019 | Diesing ................ H04L 47/125 |

\* cited by examiner

ADAPTIVE QUALITY OF SERVICE CONTROL CIRCUIT

TECHNICAL FIELD

The disclosure generally relates to managing the quality of service in processing memory transactions.

BACKGROUND

A system-on-chip (SOC) often includes components such as memory, one or more processors, and input/output (I/O) circuitry, all fabricated on a single integrated circuit die. SOCs can also include programmable logic circuitry such as that found in field programmable gate arrays (FPGAs). SOCs provide a variety of configuration parameters for regulating memory traffic and controlling the quality of service (QOS).

The quality of service (QOS) in accessing memory resources is often measured in terms of latency and bandwidth utilization. Latency is the amount of time from when a memory transaction is issued by a requester to when the requester receives data from a read transaction or an acknowledgement that a write transaction is complete. Memory bandwidth is the theoretical or advertised rate (e.g., bytes/second) at which data can be read from or written to the memory by one or more requesters, and bandwidth utilization is the percentage of the memory bandwidth consumed in processing memory transactions submitted in a system running a user's application.

Effectively regulating memory bandwidth allocation in an SOC amongst multiple requesters and traffic types can be challenging due to the complexity and variability of SOC architectures and the vast number of different applications that can be deployed on SOCs. In addition, the performance of a memory system relative to an individual one of the many control parameters is often non-linear as there are many factors beyond a single control parameter that can affect performance.

SUMMARY

A disclosed method of controlling quality of service in servicing memory transactions includes periodically reading by a quality of service management (QM) circuit disposed on a system on chip (SOC), respective first data rate metrics and respective latency metrics from a plurality of requester circuits that are also disposed on the SOC while the plurality of requester circuits are actively transmitting memory transactions to a memory controller on the SOC. The QM circuit also periodically reads a second data rate metric from the memory controller while the memory controller is processing the memory transactions. The QM circuit determines, while the plurality of requester circuits are actively transmitting memory transactions to the memory controller, whether or not the respective first data rate metrics, respective latency metrics, and second data rate metric satisfy a quality of service metric. In response to determining that the respective first data rate metrics, respective latency metrics, and second data rate metric do not satisfy the quality of service metric, the QM circuit dynamically changes one or more respective values of one or more control parameters of the plurality of requester circuits and of the memory controller.

A disclosed system includes a memory controller, a plurality of requester circuits, and a quality of service management (QM) circuit. The plurality of requester circuits are coupled to the memory controller and are configured to transmit memory access transactions to the memory controller. The QM circuit is coupled to the memory controller and to the requester circuits. The QM circuit is configured to periodically read respective first data rate metrics and respective latency metrics from the plurality of requester circuits while the plurality of requester circuits are actively transmitting memory transactions to the memory controller. The QM circuit is further configured to periodically read a second data rate metric from the memory controller while the memory controller is processing the memory transactions. The QM circuit is configured to determine while the plurality of requester circuits are actively transmitting memory transactions to the memory controller, whether or not the respective first data rate metrics, respective latency metrics, and second data rate metric satisfy a quality of service metric. In response to determining that the respective first data rate metrics, respective latency metrics, and second data rate metric do not satisfy the quality of service metric, the QM circuit is configured to dynamically change one or more respective values of one or more control parameters of the plurality of requester circuits and of the memory controller.

Other features will be recognized from consideration of the Detailed Description and Claims, which follow.

BRIEF DESCRIPTION OF THE DRAWINGS

Various aspects and features of the method and system will become apparent upon review of the following detailed description and upon reference to the drawings in which.

DETAILED DESCRIPTION

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element.

The disclosed methods and circuits provide approaches for managing quality of service (QoS) in processing memory transactions by monitoring QoS metrics and adaptively and dynamically adjusting control parameters at various points in the path between requester circuits, which issue memory transactions, and the memory controller that arbitrates access to the memory. The control parameters are dynamically adjusted in that the requester circuits need not be stopped and restarted in order to change the control parameters and have the control parameters take effect. The control parameters can be gradually adjusted over time to achieve a desired QoS.

Not only can the control parameters be dynamically adjusted, but the disclosed approaches can be employed to adaptively adjust the values of the control parameters to achieve a desired QoS. The values of the control parameters cannot or need not be known accurately prior to starting the system. Using the adaptive techniques disclosed herein, the system can be initialized with estimated values of control parameters, and thereafter the system can monitor performance, determine whether or not the performance satisfies a desired quality of service profile, and adjust the values of the control parameters such that the system converges to the desired QoS within a short period of time.

A QoS manager circuit (QM) monitors the QoS of processing memory transactions by periodically collecting QoS metrics from the requester circuits and the memory controller. The QoS metrics include, for example, bandwidth and latency statistics from the requester circuits, and from the memory controller, metrics including bandwidth, utilization, and idle time. Based on a QoS profile read from a database and the QoS metrics, the QM adjusts the values of one or more QoS control parameters. A QoS profile can specify memory controller utilization and for each type or class of memory transaction, a maximum latency and an expected bandwidth allocation.

The requester circuits, interconnect circuit, and memory controller each have QoS control parameters that can be adjusted by the QM. For example, each requester circuit has a request interval parameter and an outstanding transaction limit parameter. The interconnect circuit can have round robin weights. The memory controller has absolute bandwidth controls for different traffic classes and traffic types and round robin weights for port arbitration.

Along with satisfying a QoS profile, the QM can dynamically adjust the QoS control parameters in order to have the memory operate at or below an optimal point on a curve of bandwidth utilization vs. latency. Bandwidth utilization is the percentage of bandwidth of a circuit in use (observed data rate/the greatest data rate attainable by a circuit). As those skilled in the art recognize, the bandwidth utilization vs. latency curve describes the relationship between bandwidth utilization and latency of memory transactions. As bandwidth utilization increases, latency of memory transactions also increases, and beyond some point on the curve, latency increases exponentially as the bandwidth utilization increases. The point on the curve beyond which the latency increases exponentially is referred to as the "optimal point." The QM monitors the QoS metrics and adjusts one or more of the QoS control parameter values in order to keep the system operating at a bandwidth utilization that is at, or slightly less than the optimal point. The "operating point" is the actual bandwidth utilization reported by the memory controller and monitored by the QM. As the operating point can change as a result of different workloads at different times, the QM can adjust the QoS control parameters to ensure that the operating point does not stay above the optimal point for an extended period of time.

Figure 1:
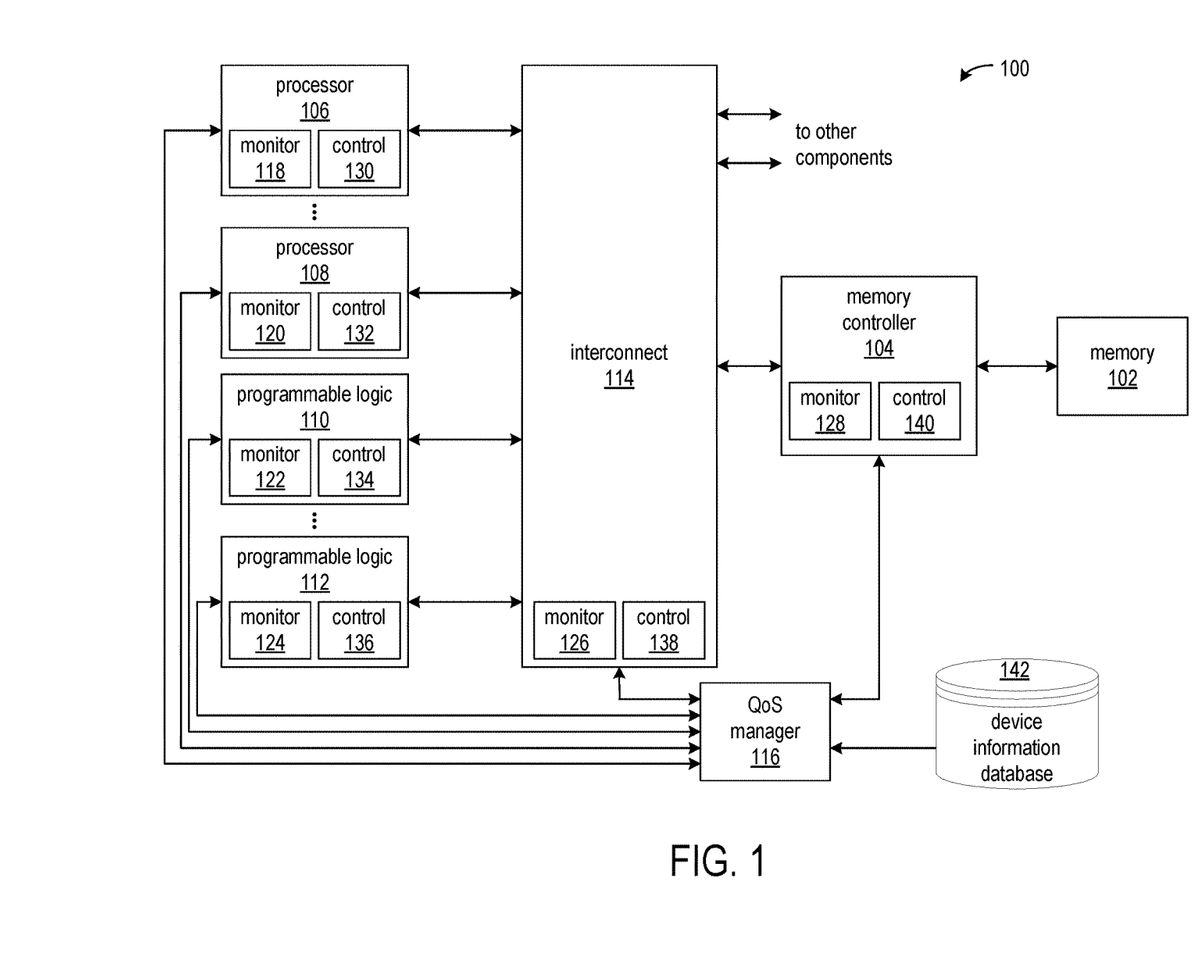
FIG. 1 shows an exemplary SoC having a QM that can dynamically adjust QoS control parameters at multiple points on the path between the requester circuits to the memory.

FIG. 1 shows an exemplary SoC 100 having a QM that can dynamically adjust QoS control parameters at multiple points on the path between the requester circuits to the memory. The system includes a memory 102, such as one or more banks of DRAM, a memory controller 104 for controlling access to the memory, multiple requester circuits, such as one or more processors 106-108 and/or one or more requesters implemented in programmable logic 110-112, and an interconnect circuit 114 that connects the requester circuits to the memory controller as well as to other components. The QM 116 can be a hardwired controller, a task executing along with other tasks on a processor in the system, or a task executing on a dedicated processor in the system.

The QM 116 is coupled to the requester circuits 106-108 and 110-112, the interconnect circuit 114, and to the memory controller 104. The requester circuits 106-108 and 110-112, the interconnect circuit 114, and the memory controller 104 have monitor circuits 118, 120, 122, 124, 126, and 128, respectively. The respective monitor circuits include logic that gathers and stores operating statistics at each of the components in registers of the monitor circuits. For example, at the requester circuits, each of the monitor circuits gathers bandwidth and latency statistics. The observed bandwidth is the rate at which data is moved from/to the requesters and the memory controller as observed by the monitor and is often expressed as bytes/second. Latency is the duration of the interval between the time at which a memory transaction is issued and the time at which the requested data is returned to the requester. The observed bandwidth and latency computed by the monitor circuits may be moving averages and/or other statistical measures, for example.

The monitor circuit 128 of the memory controller 104 includes logic that gathers and stores metrics that indicate an overall data rate, a bandwidth utilization, and the idle time, which is the percentage of time the memory controller is not processing memory transactions.

The requester circuits 106-108 and 110-112, the interconnect circuit 114, and the memory controller 104 have respective control circuits 130, 132, 134, 136, 138, and 140, and each control circuit includes one or more registers for storing values of control parameters and logic circuitry that controls the issuing and/or arbitration of queued memory transactions. The control parameters at the requester circuits include request intervals and outstanding transactions limits, and the values of the request interval and outstanding transaction limit parameters can be dynamically changed by the QM 116. The request interval parameter on each requester circuit specifies the period of time the requester circuit will wait between the transmission of one memory transaction and the transmission of the next memory transaction. Those skilled in the art will recognize other approaches for regulating the bandwidth of the requester circuits. For example, multiple parameters can be used to specify a desired statistical distribution of different request intervals over time.

The outstanding transaction limit parameter on each requester circuit specifies the maximum number of incomplete memory transactions the requester circuit is allowed. Once the number of incomplete memory transactions from the requester circuit reaches the outstanding transaction limit, the control circuit of the requester blocks the requester circuit from issuing another memory transaction until an outstanding memory transaction completes.

The control parameters at the interconnect circuit include round-robin weights for example. The round robin weights can be dynamically changed by the QM 116 and are used by the control circuit 138 of the interconnect circuit to select between memory transactions from the requesting circuits in proportion to the weights associated with queues of transactions from the requesting circuits. A weight is assigned to each queue, and the weight controls the amount of bandwidth allocated to the queue.

The control parameters at the memory controller include absolute bandwidth controls and port arbitration weights, for example. The memory controller can have multiple ports, and for each port the memory controller can have multiple queues for different types and classes of memory transactions. Each type or class of memory transaction can have an associated absolute bandwidth parameter, and the control circuit 140 limits memory transactions according to the absolute bandwidth parameters of the different queues at each port. As between the ports, the control circuit uses the port arbitration weights to select memory transactions from the ports in proportion to the associated weights.

In the exemplary system 100, a device information database 142 specifies desired QoS metrics for the components in the system. Each of the requester circuits 106-108 and 110-112 can have an associated QoS metric that specifies the maximum latency of memory transactions from that requester circuit. For example, if the QM determines that the latency metric reported by the monitor circuit 118 is greater than the maximum latency, the QM can adjust the control parameters of one or more of the other requesting circuits 108 and 110-112 in order to allocate a greater portion of the available bandwidth to the requesting circuit 106.

The device information database can further specify for each traffic type or traffic class a bandwidth allocation. Different traffic types include bursty and uniform, for example, and different traffic classes include read high priority, read isochronous, read best effort, write isochronous and write best effort. A QoS profile can specify different bandwidth allocations for the different traffic types and classes.

During operation, the QM 116 periodically reads respective data rate metrics and latency metrics from the requester circuits 106-108 and 110-112 while the requester circuits are actively transmitting memory requests to the memory controller 104. The QM also periodically reads a data rate metric, bandwidth utilization metric, and idle time metric from the memory controller while the memory controller is processing the memory requests. While the requester circuits are actively transmitting memory transactions, the QM determines whether or not the respective data rate metrics, latency metrics, bandwidth utilization, and idle time metric satisfy the metrics of a QoS profile from the device information database 142. If the QoS profile is not satisfied, the QM dynamically changes the value(s) of one or more control parameters of the requester circuits, the interconnect circuit, and/or of the memory controller.

Control parameters can be changed on the fly, and the new value(s) take effect in a way that does not interrupt data flow. For example, to change the request interval, a new value of the control parameter can be written to the appropriate register of the requester circuit by the QM, and the control circuit of the requesting device will read the new value on the next request interval boundary. Similarly, round robin weights can be written by the QM to registers of the memory controller, and an arbitration state machine of the memory controller copies the weights at every regulation interval. The requester circuits, interconnect circuit, and memory controller read the new control parameter values each time a decision is made to make a request or arbitrate queued transactions. Control signaling between the QM and the requester circuits, interconnect circuit, and memory controller protect against use of partial or inconsistent values during transitions.

Figure 2:
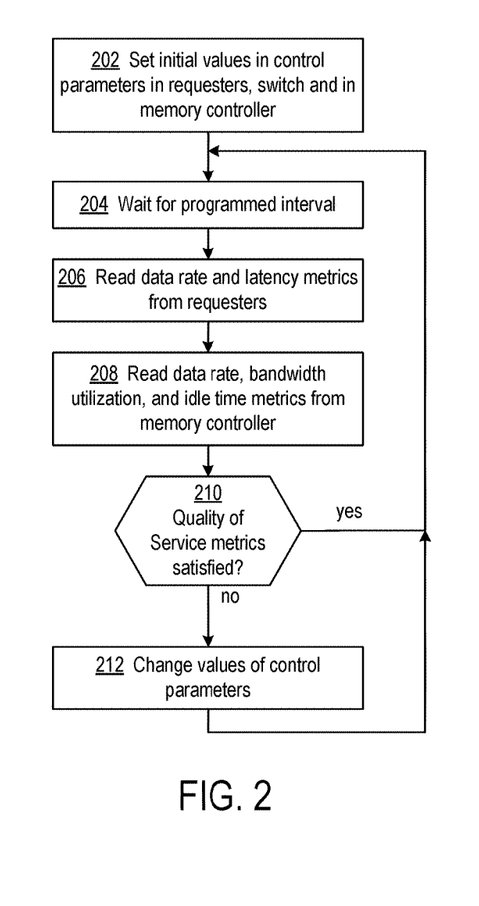
FIG. 2 shows a flowchart of an exemplary process of monitoring QoS metrics and adjusting values of QoS control parameters.

FIG. 2 shows a flowchart of an exemplary process of monitoring QoS metrics and adjusting values of QoS control parameters. At block 202, the QM 116 sets initial values in control parameters of the requester circuits 106-108, interconnect circuit 114, and memory controller 104. The initial values may be approximated based on experiences with other systems. The QM will over time adapt the values of the control parameters to those that achieve a desired QoS.

The QM periodically evaluates the QoS and adjusts the value(s) of one or more of the control parameters accordingly. At block 204, the QM waits for a programmed interval of time, and at block 206 the QM reads the performance metrics from the requester circuits. The performance metrics of the requester circuits can include respective data rates and latencies. At block 208, the QM reads the performance metrics from the memory controller. The performance metrics of the memory controller can include the aggregate data rate, bandwidth utilization, and idle time.

At block 210, the QM compares the performance metrics to a QoS metric and/or QoS profile from the device information database. If the performance metrics satisfy the QoS metric and/or QoS profile, the process returns to block 204 and continues processing as described above. If the performance metrics do not satisfy the QoS metric and/or QoS profile, the QM changes the value(s) of one or more control parameters at block 212. For example, the QM can change the request interval and/or the outstanding transaction limit control parameters of one or more of the requesting circuits, and/or change the round robin weights of the interconnect circuit, and/or change a data rate limit and/or round robin weights used by the memory controller. If the idle time of the memory controller is greater than a threshold, the QM can reduce the request interval on one or more of the requester circuits.

In an exemplary approach to adjusting the values of the control parameters, negative feedback is used to adjust the values such that the observed QoS converges to the desired QoS through gradual adjustment. An error value is the difference between the desired value and the observed value, and the QM uses a portion, which can be mathematically-derived by recognized methods, of the error value as an adjustment or correction value by which the value(s) of one or more of the control parameters are adjusted.

Control signaling between the QM and the requester circuits, interconnect circuit, and memory controller protects against use of partial or inconsistent values of control parameters during transitions. For example, the QM and components can employ a handshake mechanism to signal initiation and completion of changes in parameter values.

Figure 3:
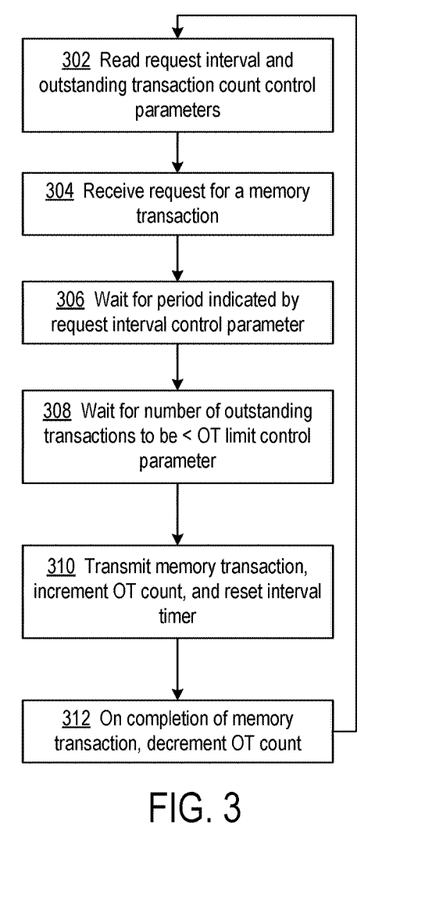
FIG. 3 shows a flowchart of an exemplary process performed by the control circuit of a requesting circuit in issuing memory transactions.

FIG. 3 shows a flowchart of an exemplary process performed by the control circuit of a requesting circuit in issuing memory transactions. The control circuit at block 302, at the commencement of each iteration of issuing a memory transaction, reads the values of the control parameters. Reading the values of the control parameters on each iteration recognizes the adaptive and dynamic changes to the control parameters by the QM. Control signaling between the QM and the control circuits of the requester circuits protects against use of partial or inconsistent values during transitions.

At block 304, the control circuit receives from the requesting circuit a memory transaction to issue to the memory controller. At block 306, the control circuit waits if the amount time specified by the request interval parameter has not passed. The request interval specifies the amount of time for the control circuit to wait between the issuing of one memory transaction and issuing the next memory transaction.

At block 308, the control circuit waits if the number of outstanding transactions is greater than or equal to the outstanding transaction limit control parameter. The control circuit waits until the number of outstanding transactions is less than the outstanding transaction limit control parameter.

The control circuit transmits the memory transaction at block 310, increments the count of outstanding transactions, and resets the request interval timer. At block 312, in response to completion of a memory transaction, the control circuit decrements the count of outstanding transactions and returns the process to block 302 as described above.

Figure 4:
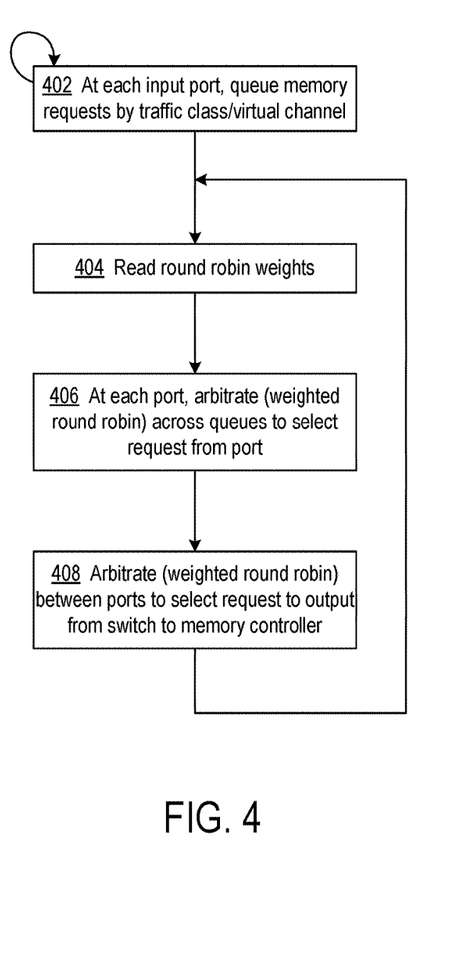
FIG. 4 shows a flowchart of an exemplary process performed by the control circuit of the interconnect circuit in arbitrating memory transactions.

FIG. 4 shows a flowchart of an exemplary process performed by the control circuit of the interconnect circuit in arbitrating memory transactions. The interconnect circuit has multiple input ports that are connected to the requester circuits, respectively. At block 402, the interconnect queues memory transactions by traffic class or virtual channel at each input port.

At the commencement of each iteration of arbitrating memory transactions from the queues, the interconnect circuit at block 404 reads the values of the control parameters (round robin weights) as the QM can change the values of the parameters while memory transactions are outstanding, that is incomplete. Control signaling between the QM and the control circuit of the interconnect circuit protects against use of partial or inconsistent values during transitions.

At block 406, the control circuit of the interconnect circuit arbitrates between the queues at each port using the round robin weights associated with the traffic classes or virtual channels. The weighted round robin arbitration can select memory transactions from the queues based on the weights associated with the queues, traffic classes, and/or virtual channels. At block 408, the control circuit arbitrates between the transactions selected from the ports according to the round robin weights associated with the ports. After selection of a memory transaction to transmit to the memory controller, the control circuit of the interconnect circuit returns to block 404 as described above.

Figure 5:
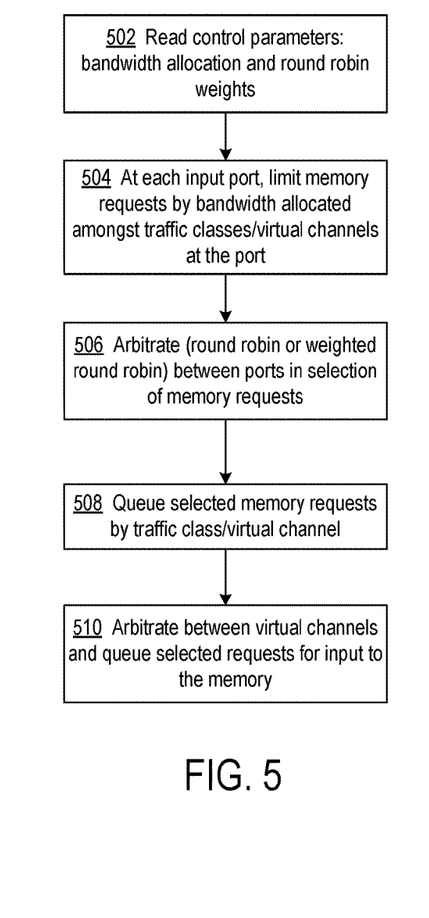
FIG. 5 shows a flowchart of an exemplary process performed by the control circuit of a memory controller in arbitrating memory transactions.

FIG. 5 shows a flowchart of an exemplary process performed by the control circuit of a memory controller in arbitrating memory transactions. At block 502, the control circuit of the memory controller reads values of control parameters for arbitrating memory transactions. Control signaling between the QM and the memory controller protects against use of partial or inconsistent values during transitions.

At each input port of the memory controller, the control circuits at block 504 regulates incoming transactions according to values of control parameters that specify absolute bandwidth limits on the traffic classes/virtual channels. The memory controller does not allow memory transactions of a particular traffic class/virtual channel to exceed the specified absolute bandwidth limit for the traffic class/virtual channel at that port.

At block 506, the control circuit of the memory controller arbitrates between the ports in selecting memory transactions. The port arbitration can be round robin or weighted round robin according to the values of the control parameters. The values of the round robin weights enforce a desired allocation of bandwidth across the ports. The selected memory transactions can be queued by traffic class/virtual channel at block 508. At block 510, the control circuit arbitrates between the queues (round robin or weighted round robin) and places the transactions in a single, first-in-first-out queue for submitting the transactions to the memory.

Figure 6:
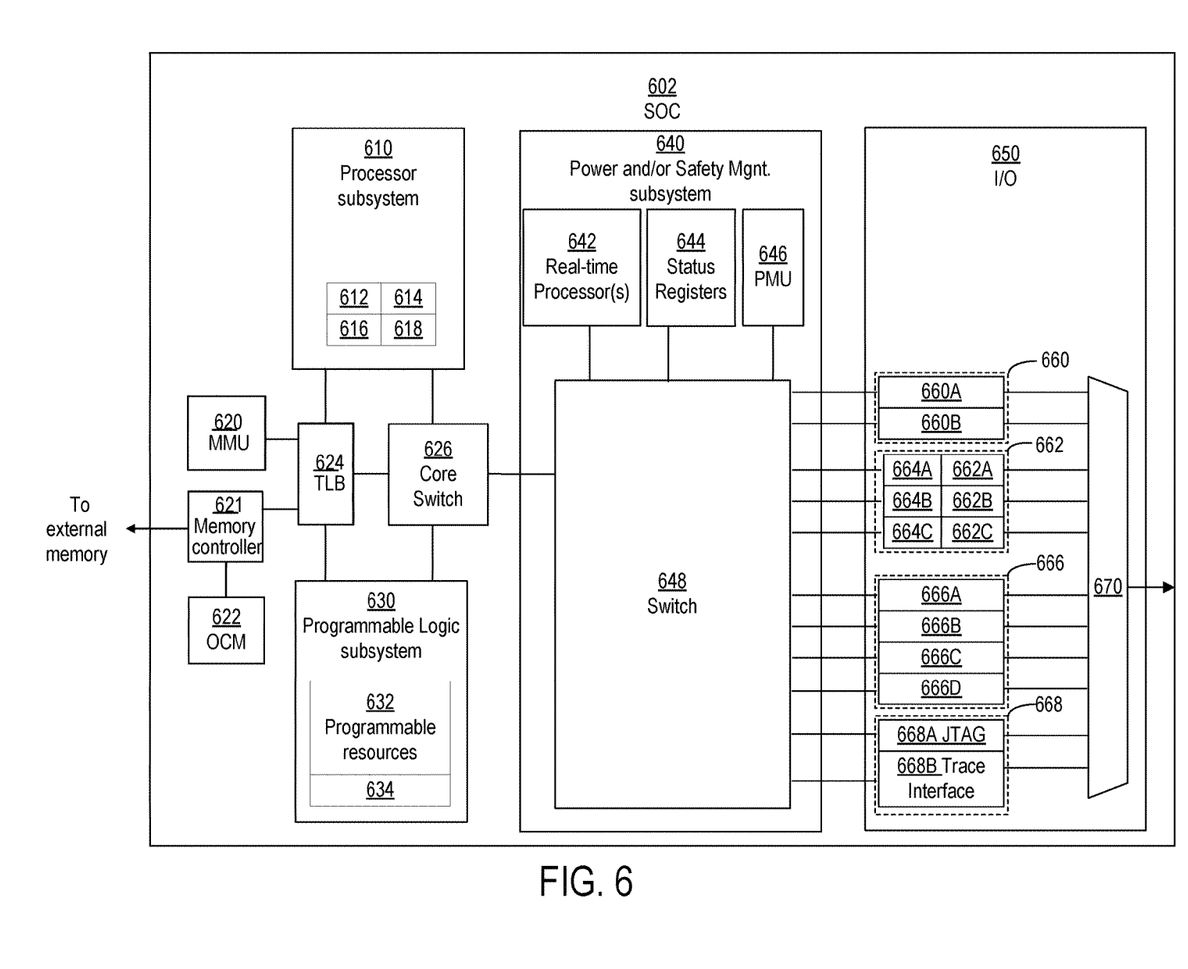
FIG. 6 shows an exemplary programmable IC that can be configured in accordance with the disclosed circuitry.

FIG. 6 shows an exemplary programmable IC 602 that can be configured in accordance with the disclosed circuitry. The programmable IC may also be referred to as a System On Chip (SOC), which includes a processor subsystem 610 and a programmable logic subsystem 630. The processor subsystem 610 may be programmed to implement a software portion of the user design, via execution of a user program. The program may be specified as part of a configuration data stream or may be retrieved from an on-chip or off-chip data storage device. The processor subsystem 610 may include various circuits 612, 614, 616, and 618 for executing one or more software programs. The circuits 612, 614, 616, and 618 may include, for example, one or more processor cores, floating point units (FPUs), an interrupt processing unit, on chip-memory, memory caches, and/or cache coherent interconnect.

The programmable logic subsystem 630 of the programmable IC 602 may be programmed to implement a hardware portion of a user design. For instance, the programmable logic subsystem may include a number of programmable resources 632, which may be programmed to implement a set of circuits specified in a configuration data stream. The programmable resources 632 include, for example, programmable interconnect circuits, programmable logic circuits, and configuration memory cells. The programmable logic implements the logic of a user design using programmable elements that can include, for example, function generators, registers, arithmetic logic, and so forth. Programmable interconnect circuits may include a large number of interconnect lines of varying lengths interconnected by programmable interconnect points (PIPs).

The programmable resources 632 may be programmed by loading a configuration data stream into the configuration memory cells, which define how the programmable interconnect circuits and programmable logic circuits are configured. For example, setting a configuration memory cell for a configurable latch to a first value may direct the configurable latch to operate as a single-edge-driven latch. Setting the configuration memory cell to a second value may direct the configurable latch to operate as a double-edge-driven latch. The collective states of the individual memory cells then determine the function of the programmable resources 632. The configuration data can be read from memory (e.g., from an external PROM) or written into the programmable IC 602 by an external device. In some implementations, a configuration controller 634 included in the programmable logic subsystem 630 may program the programmable resources, in response to powering on the programmable IC, by retrieving configuration data from a non-volatile memory coupled to the programmable IC and loading the configuration data into the configuration memory cells. In some other implementations, the configuration data may be loaded into the configuration memory cells by a start-up process executed by the processor subsystem 610.

The programmable IC 602 may include various circuits to interconnect the processor subsystem 610 with circuitry implemented within the programmable logic subsystem 630. In this example, the programmable IC 602 includes a core switch 626 that can route data signals between various data ports of the processor subsystem 610 and the programmable logic subsystem 630. The core switch 626 may also route data signals between either of the programmable logic or processing subsystems 610 and 630 and various other circuits of the programmable IC, such as an internal data bus. Alternatively or additionally, the processor subsystem 610 may include an interface to directly connect with the programmable logic subsystem—bypassing the core switch 626. Such an interface may be implemented, for example, using the AMBA AXI Protocol Specification (AXI) as published by ARM.

In some implementations, the processor subsystem 610 and the programmable logic subsystem 630 may also read or write to memory locations of an on-chip memory 622 or off-chip memory (not shown) via memory controller 621. The memory controller 621 can be implemented to communicate with one or more different types of memory circuits including, but not limited to, Dual Data Rate (DDR) 2, DDR3, Low Power (LP) DDR2 types of memory, whether 16-bit, 32-bit, 16-bit with ECC, etc. The list of different memory types with which memory controller 621 is able to communicate is provided for purposes of illustration only and is not intended as a limitation or to be exhaustive. As shown in FIG. 6, the programmable IC 602 may include a memory management unit 620 and translation look-aside buffer 624 to translate virtual memory addresses used by the subsystems 610 and 630 to physical memory addresses used by the memory controller 621 to access specific memory locations.

The programmable IC may include an input/output (I/O) subsystem 650 for communication of data with external circuits. The I/O subsystem 650 may include various types of I/O devices or interfaces including for example, flash memory type I/O devices, higher performance I/O devices, lower performance interfaces, debugging I/O devices, and/or RAM I/O devices.

The I/O subsystem 650 may include one or more flash memory interfaces 660 illustrated as 660A and 660B. For example, one or more of flash memory interfaces 660 can be implemented as a Quad-Serial Peripheral Interface (QSPI) configured for 4-bit communication. One or more of flash memory interfaces 660 can be implemented as a parallel 8-bit NOR/SRAM type of interface. One or more of flash memory interfaces 660 can be implemented as a NAND interface configured for 8-bit and/or 16-bit communication. It should be appreciated that the particular interfaces described are provided for purposes of illustration and not limitation. Other interfaces having different bit widths can be used.

The I/O subsystem 650 can include one or more interfaces 662 providing a higher level of performance than flash memory interfaces 660. Each of interfaces 662A-662C can be coupled to a DMA controller 664A-664C respectively. For example, one or more of interfaces 662 can be implemented as a Universal Serial Bus (USB) type of interface. One or more of interfaces 662 can be implemented as a gigabit Ethernet type of interface. One or more of interfaces 662 can be implemented as a Secure Digital (SD) type of interface.

The I/O subsystem 650 may also include one or more interfaces 666 such as interfaces 666A-666D that provide a lower level of performance than interfaces 662. For example, one or more of interfaces 666 can be implemented as a General Purpose I/O (GPIO) type of interface. One or more of interfaces 666 can be implemented as a Universal Asynchronous Receiver/Transmitter (UART) type of interface. One or more of interfaces 666 can be implemented in the form of a Serial Peripheral Interface (SPI) bus type of interface. One or more of interfaces 666 can be implemented in the form of a Controller-Area-Network (CAN) type of interface and/or an $I^2C$ type of interface. One or more of interfaces 666 also can be implemented in the form of a timer type of interface.

The I/O subsystem 650 can include one or more debug interfaces 668 such as processor JTAG (PJTAG) interface 668A and a trace interface 668B. PJTAG interface 668A can provide an external debug interface for the programmable IC 602. Trace interface 668B can provide a port to receive debug, e.g., trace, information from the processor subsystem 610 or the programmable logic subsystem 630.

As shown, each of interfaces 660, 662, 666, and 668 can be coupled to a multiplexer 670. Multiplexer 670 provides a plurality of outputs that can be directly routed or coupled to external pins of the programmable IC 602, e.g., balls of the package within which the programmable IC 602 is disposed. For example, I/O pins of programmable IC 602 can be shared among interfaces 660, 662, 666, and 668. A user can configure multiplexer 670, via a configuration data stream to select which of interfaces 660-668 are to be used and, therefore, coupled to I/O pins of programmable IC 602 via multiplexer 670. The I/O subsystem 650, may also include a fabric multiplexer I/O (FMIO) interface (not shown) to connect interfaces 662-668 to programmable logic circuits of the programmable logic subsystem. Additionally or alternatively, the programmable logic subsystem 630 can be configured to implement one or more I/O circuits within programmable logic. In some implementations, the programmable IC 602 may also include a subsystem 640 having various circuits for power and/or safety management. For example, the subsystem 640 may include a power management unit 646 configured to monitor and maintain one or more voltage domains used to power the various subsystems of the programmable IC 602. In some implementations, the power management unit 646 may disable power of individual subsystems, when idle, to reduce power consumption, without disabling power to subsystems in use.

The subsystem 640 may also include safety circuits to monitor the status of the subsystems to ensure correct operation. For instance, the subsystem 640 may include one or more real-time processors 642 configured to monitor the status of the various subsystems (e.g., as indicated in status registers 644). The real-time processors 642 may be configured to perform a number of tasks in response to detecting errors. For example, for some errors, the real-time processors 642 may generate an alert in response to detecting an error. As another example, the real-time processors 642 may reset a subsystem to attempt to restore the subsystem to correct operation. The subsystem 640 includes a switch network 648 that may be used to interconnect various subsystems. For example, the switch network 648 may be configured to connect the various subsystems 610, 630, and 640 to various interfaces of the I/O subsystem 650. In some applications, the switch network 648 may also be used to isolate the real-time processors 642 from the subsystems that are to be monitored. Such isolation may be required by certain application standards (e.g., IEC-61508 SIL3 or ISO-26262 standards) to ensure that the real-time processors 642 are not affected by errors that occur in other subsystems.

Though aspects and features may in some cases be described in individual figures, it will be appreciated that features from one figure can be combined with features of another figure even though the combination is not explicitly shown or explicitly described as a combination.

The disclosed methods and systems are thought to be applicable to a variety of systems for managing quality of service in processing memory traffic. Other aspects and features will be apparent to those skilled in the art from consideration of the specification. The methods and system may be implemented as one or more processors configured to execute software, as an application specific integrated circuit (ASIC), or as a logic on a programmable logic device. It is intended that the specification and drawings be considered as examples only, with a true scope of the invention being indicated by the following claims.

What is claimed is:

1. A method of controlling quality of service in servicing memory transactions, comprising:
gathering by a plurality of monitor circuits, respective first data rate metrics and respective latency metrics from a plurality of requester circuits disposed on a system on chip (SOC) while the plurality of requester circuits are actively transmitting memory transactions to a memory controller on the SOC;
gathering by another monitor circuit, a second data rate metric from the memory controller while the memory controller is processing the memory transactions;
periodically reading by a quality of service management (QM) circuit disposed on the SOC, the respective first data rate metrics and respective latency metrics from the plurality of monitor circuits while the plurality of requester circuits are actively transmitting memory transactions to the memory controller;
periodically reading by the QM circuit the second data rate metric from the other monitor circuit while the memory controller is processing the memory transactions; and
dynamically changing one or more respective values of one or more control parameters of the plurality of requester circuits and of the memory controller by the QM circuit, in response to determining by the QM circuit while the plurality of requester circuits are actively transmitting memory transactions to the memory controller, that the respective first data rate metrics, respective latency metrics, and second data rate metric do not satisfy a quality of service metric.

2. The method of claim 1, further comprising, changing a value of a control parameter of an interconnect circuit that couples the plurality of requester circuits to the memory controller, in response to determining that the respective first data rate metrics, respective latency metrics, and second data rate metric do not satisfy the quality of service metric.

3. The method of claim 1, further comprising:
periodically reading an idle time metric from the memory controller as the memory controller is processing the memory transactions; and
determining that the idle time metric does not satisfy the quality of service metric.

4. The method of claim 1, wherein the determining includes:
determining a utilization metric based on the second data rate metric and a bandwidth rating of the memory controller; and
determining that the utilization metric does not satisfy the quality of service metric.

5. The method of claim 1, wherein:
the periodically reading includes periodically reading a bandwidth utilization metric of the memory controller by the QM circuit; and
the changing includes changing one or more respective values of one or more control parameters of the plurality of requester circuits and of the memory controller in response to determining that the bandwidth utilization metric is greater than a threshold bandwidth utilization.

6. The method of claim 1, wherein the changing includes changing one or more respective values of one or more request intervals associated with one or more of the plurality of requester circuits.

7. The method of claim 1, wherein the changing includes changing one or more respective values of one or more outstanding transaction limits associated with one or more of the plurality of requester circuits.

8. The method of claim 1, wherein the changing includes changing one or more respective values of one or more round robin weights associated with one or more ports on an interconnect circuit that couples the plurality of requester circuits to the memory controller.

9. The method of claim 1, wherein the changing includes changing a value of a bandwidth control of the memory controller.

10. The method of claim 1, wherein the changing includes changing one or more values of one or more round robin weights associated with ports of the memory controller.

11. A system, comprising:
a memory controller;
a plurality of requester circuits coupled to the memory controller and configured to transmit memory access transactions to the memory controller;
a plurality of first monitor circuits coupled to the plurality of requester circuits, respectively, wherein each of the respective plurality of first monitor circuits is configured to gather a respective first data rate metric and a respective latency metric from one of the requester circuits while the requester circuit is actively transmitting memory transactions to the memory controller;
a second monitor circuit coupled to the memory controller and configured to gather a second data rate metric from the memory controller while the memory controller is processing the memory transactions; and
a quality of service management (QM) circuit coupled to the memory controller and to the requester circuits, wherein the QM circuit is configured to:
periodically read the respective first data rate metrics and respective latency metrics from the plurality of first monitor circuits while the plurality of requester circuits are actively transmitting memory transactions to the memory controller;
periodically read the second data rate metric from the second monitor circuit while the memory controller is processing the memory transactions; and
dynamically change one or more respective values of one or more control parameters of the plurality of requester circuits and of the memory controller, in response to determining while the plurality of requester circuits are actively transmitting memory transactions to the memory controller, that the respective first data rate metrics, respective latency metrics, and second data rate metric do not satisfy the quality of service metric.

12. The system of claim 11, wherein the QM circuit is further configured to change value of a control parameter of an interconnect circuit that couples the plurality of requester circuits to the memory controller, in response to determining that the respective first data rate metrics, respective latency metrics, and second data rate metric do not satisfy the quality of service metric.

13. The system of claim 11, wherein the QM circuit is further configured to:
periodically read an idle time metric from the memory controller as the memory controller is processing the memory transactions; and determine that the idle time metric does not satisfy the quality of service metric.

14. The system of claim 11, wherein the QM circuit is further configured to:
    determine a utilization metric based on the second data rate metric and a bandwidth rating of the memory controller; and
    determine that the utilization metric does not satisfy the quality of service metric.

15. The system of claim 11, wherein the QM circuit is further configured to:
    periodically read a bandwidth utilization metric of the memory controller; and
    change one or more respective values of one or more control parameters of the plurality of requester circuits and of the memory controller in response to determining that the bandwidth utilization metric is greater than a threshold bandwidth utilization.

16. The system of claim 11, wherein the QM circuit is further configured to change one or more respective values of one or more request intervals associated with one or more of the plurality of requester circuits.

17. The system of claim 11, wherein the QM circuit is further configured to change one or more respective values of one or more outstanding transaction limits associated with one or more of the plurality of requester circuits.

18. The system of claim 11, wherein the QM circuit is further configured to change one or more respective values of one or more round robin weights associated with one or more ports on an interconnect circuit that couples the plurality of requester circuits to the memory controller.

19. The system of claim 11, wherein the QM circuit is further configured to change a value of a bandwidth control of the memory controller.

20. The system of claim 11, wherein the QM circuit is further configured to change one or more values of one or more round robin weights associated with ports of the memory controller.

* * * * *